United States Patent

Sakamoto

Patent Number: 5,969,455
Date of Patent: Oct. 19, 1999

[54] INSULATED BOBBIN FOR STATOR

[75] Inventor: Tetuya Sakamoto, Tokyo, Japan

[73] Assignee: Mitsubishi Denki Kabushiki Kaisha, Tokyo, Japan

[21] Appl. No.: 09/217,627

[22] Filed: Dec. 22, 1998

[30] Foreign Application Priority Data

Jul. 8, 1998 [JP] Japan ................................. 10-193212

[51] Int. Cl.$^6$ .................................................. H02K 15/04
[52] U.S. Cl. ......................... 310/194; 310/215; 310/43; 310/42; 310/214
[58] Field of Search .................... 310/194, 215, 310/43, 42, 214

[56] References Cited

U.S. PATENT DOCUMENTS

| | | | |
|---|---|---|---|
| 3,339,097 | 8/1967 | Dunn ........................................ | 310/194 |
| 4,818,911 | 4/1989 | Taguchi et al. ......................... | 310/259 |
| 4,835,839 | 6/1989 | Forbes et al. ........................... | 29/596 |
| 5,698,923 | 12/1997 | Scherzinger et al. .................. | 310/194 |
| 5,780,951 | 7/1998 | Stephens ................................. | 310/172 |

FOREIGN PATENT DOCUMENTS 58-124051   8/1983   Japan .

*Primary Examiner*—Nestor Ramirez
*Assistant Examiner*—Saeed Ghahramani
*Attorney, Agent, or Firm*—Sughrue, Mion, Zinn, Macpeak & Seas, PLLC

[57] ABSTRACT

Disclosed is an insulated bobbin for stator which has good insertability of a stator iron core with no reduction of coil winding space.

A first bobbin and a second bobbin each comprise a bobbin inner rim wall, provided along an outer rim face of an iron core main body, and a projections projecting from the bobbin inner rim wall in the diameter direction in correspondence with a plurality of projecting poles, each projection being U-shaped in cross-section with an opening on the division side, and a pair of side walls of the projections being of different height in the central axial direction so that a step is created by their edges.

11 Claims, 13 Drawing Sheets

INSULATED BOBBIN FOR STATOR

BACKGROUND OF THE INVENTION

1. Field of the Invention

The present invention relates to an insulated bobbin for a stator in a multipolar magneto used as an electrical component in the engine of a two-wheeled vehicle, a snowmobile, outboard equipment, a buggy, a water-bike and the like.

2. Description of the Related Art

Figure 12:
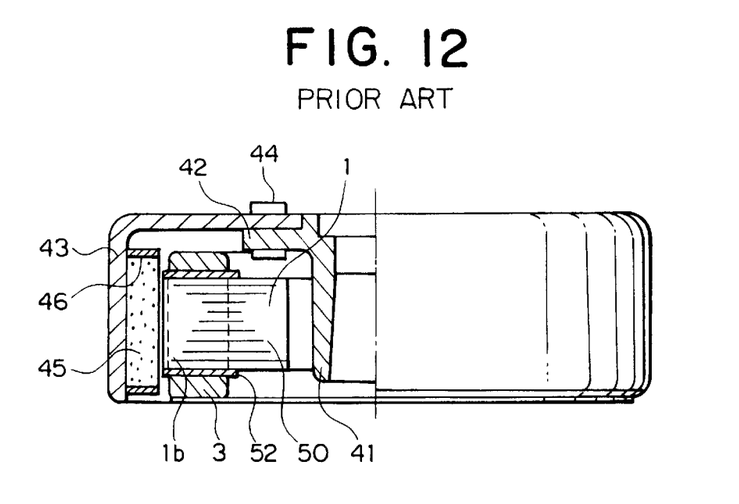
FIG. 12 is a partially sectional side view of a conventional multipolar magneto.
Figure 13:
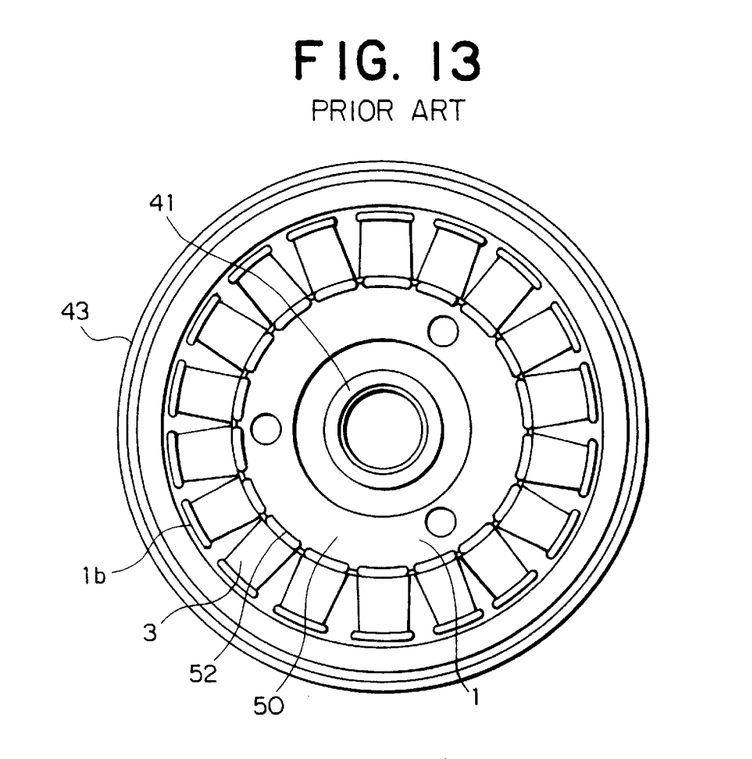
FIG. 13 is a front view of a conventional multipolar magneto.
Figure 14:
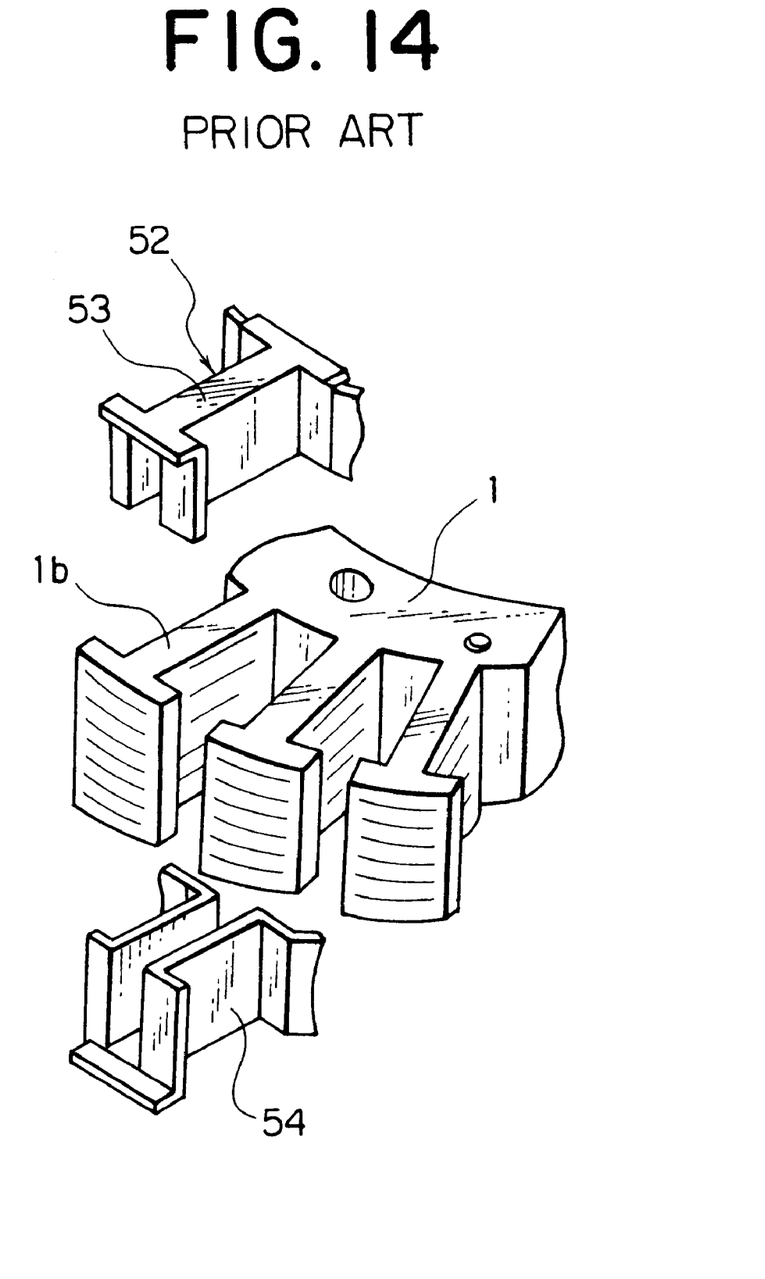
FIG. 14 is a perspective view of an insulated bobbin for stator of a conventional multipolar magneto.

FIG. 12 is a partially sectional side view of a conventional multipolar magneto as disclosed, for instance, in Japanese Unexamined Utility Model Publication No. 58-124051. Furthermore, FIG. 13 is a front view of a multipolar magneto. Furthermore, FIG. 14 is a perspective view of an insulated bobbin for a stator of a conventional multipolar magneto. In FIG. 12 and FIG. 13, a tapered portion is provided to the center of a center piece 41 and is fitted to the crankshaft of an engine. A fly wheel 43 is molded from an iron plate and is fixed to a flange 42 of the center piece 41 by a rivet 44.

Then, magnets 45 and non-magnetic support plates 46 are attached to the inner rim of the fly wheel 43, the magnets 45 being provided in the perimeter direction with alternately different polarities. On the inner side of the magnets 45, a stator 50 is fixed so as to face the inner side with a gap therebetween. The stator 50 has the following constitution.

As shown in FIG. 14, a stator iron core 1 has multiple projecting poles 1b extending radially, the projecting poles 1b being formed by lamination of multiple thin iron layers. As shown in FIG. 12 and FIG. 13, generator coil 3 is wound around the projecting poles 1b, and these are electrically connected to form a generator circuit. Insulated bobbins 52 are made from resin and are fitted into the wire-winding portions of the projecting poles 1b. Each insulated bobbin 52 is divided into a first bobbin 53 and a second bobbin 54, which clasp the projecting pole 1b from each side with respect to the lamination direction of the stator iron core 1.

Figure 15:
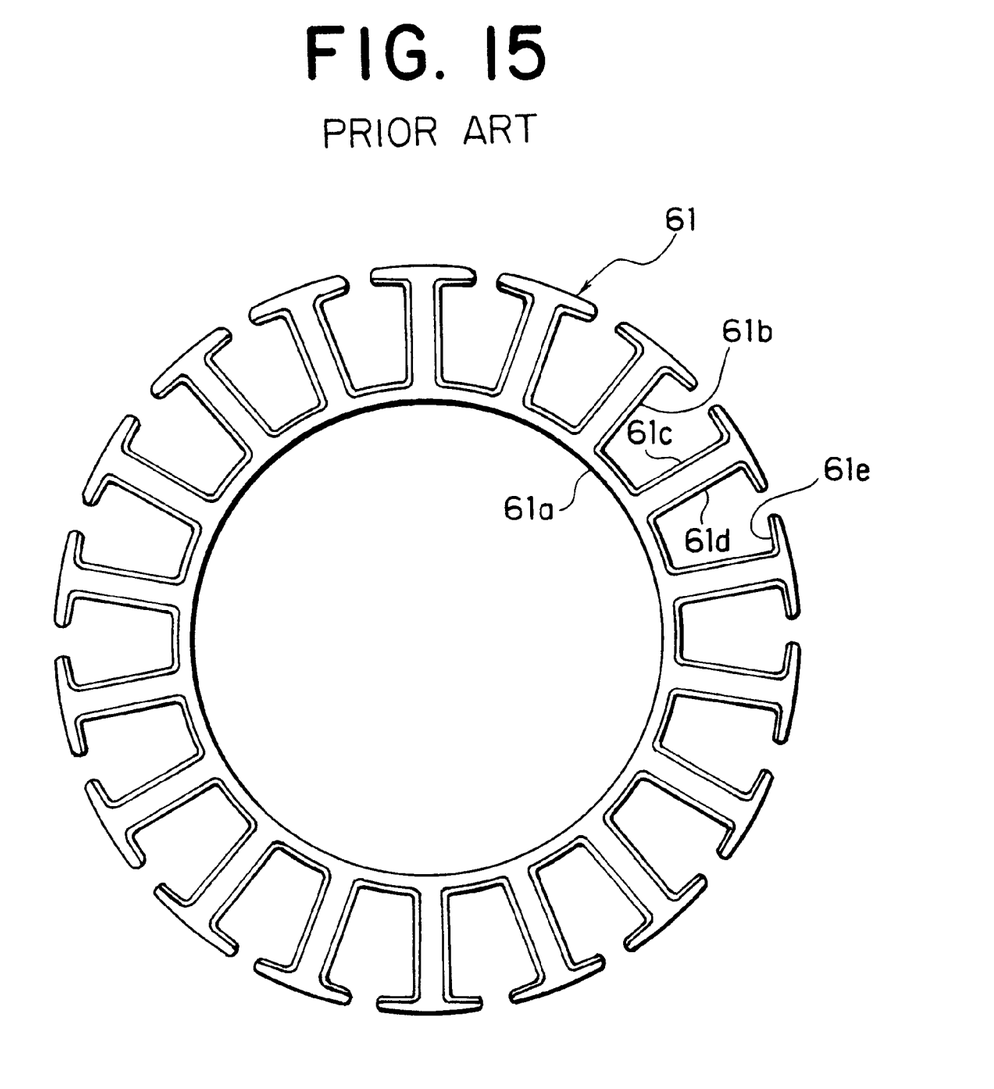
FIG. 15 is a front view of another example of an insulated bobbin for stator of one side in a conventional multipolar magneto.
Figure 16:
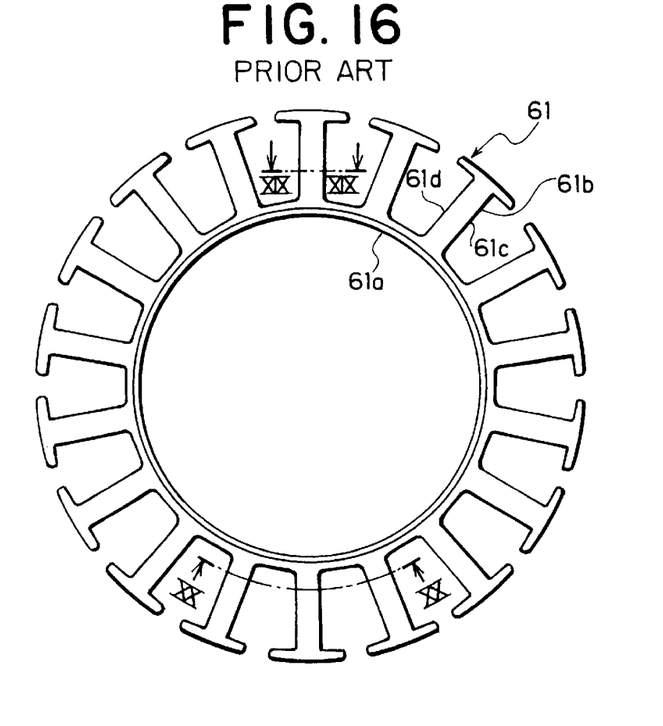
FIG. 16 is an under side view of a conventional bobbin of one side.
Figure 17:
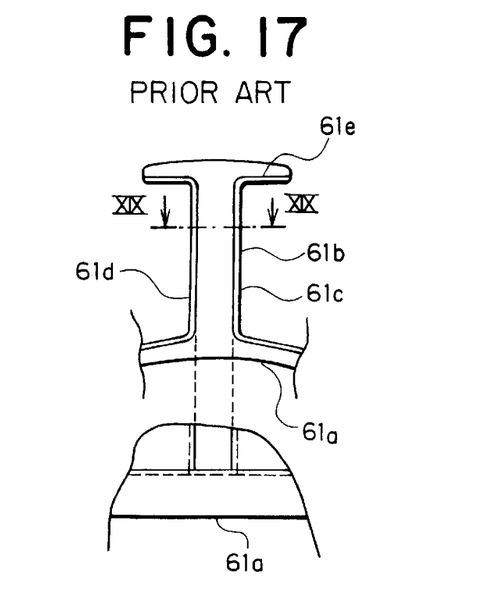
FIG. 17 is a front view of a part corresponding to one projecting pole and a view of the same part from the inside of the bobbin.
Figure 18:
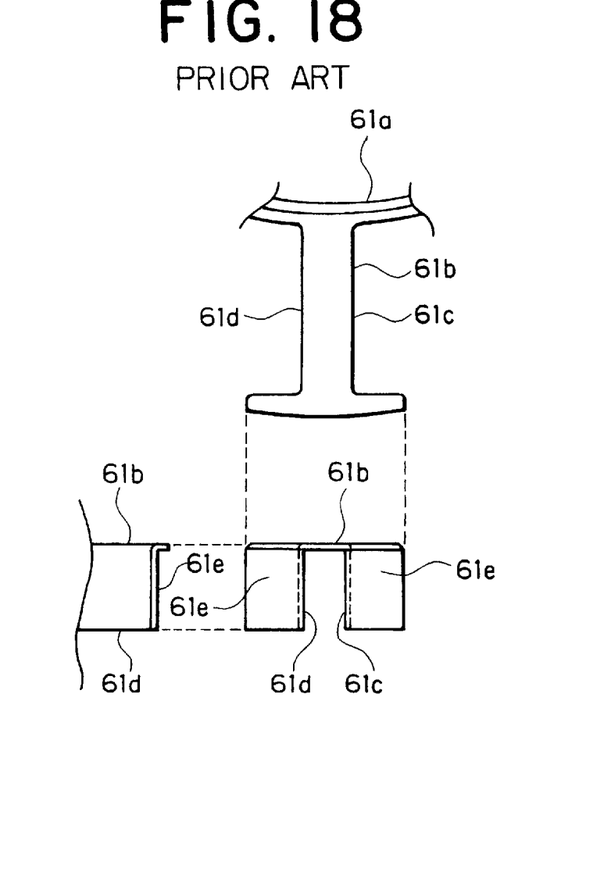
FIG. 18 is an under side view of a part corresponding to one projecting pole and a view of the same part from the outside of the bobbin.
Figure 19:
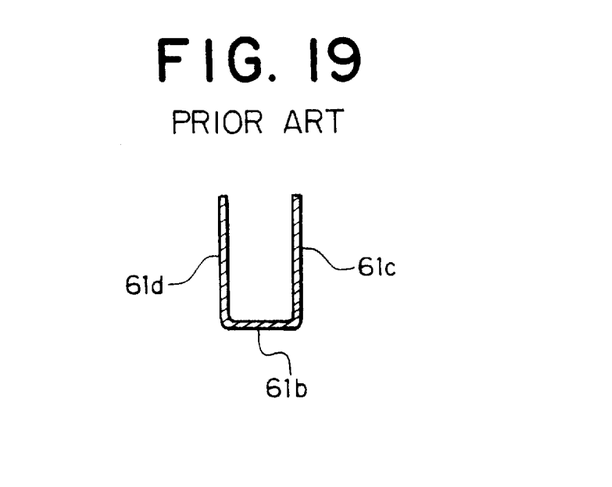
FIG. 19 is a cross-sectional view taken along the line XIX—XIX of FIG. 16 and FIG. 17.

FIG. 15 is a front view of another example of an insulated bobbin for stator in a conventional multipolar magneto, illustrating the bobbin of one side only. FIG. 16 is an underside view of a bobbin. Furthermore, FIG. 17 shows a front view of parts corresponding to one projecting pole 1b and a view of these parts from the inner side of the bobbin, and FIG. 18 shows an underside view of parts corresponding to one projecting pole 1b and a view of these parts from the outside of the bobbin and from the side. On the other hand, FIG. 19 is a cross-sectional view taken along the line XIX—XIX of FIG. 16 and FIG. 17. Furthermore, FIG. 20 is a cross-sectional view and a partially enlarged cross-sectional view taken along the line XX—XX of FIG. 16.

In FIG. 15–FIG. 18, the insulated bobbin for stator is divided into two bobbins of identical shape. Below, only a first bobbin 61 of one side will be explained. Firstly, the bobbin 61 has a substantially cylindrical bobbin inner rim wall 61a. Then, a projection 61b, which is U-shaped in cross-section, projects radially from the bobbin inner rim wall 61a in the diameter direction. The projection 61b has a pair of side walls 61c and 61d which extend along both side faces of the projecting pole 1b of the core 1. A brim 61e is provided at the tip of the projection 61b and spreads along the flange of the core 1.

Furthermore, as shown clearly in FIG. 19, the pair of side walls 61c and 61d of the projection 61b are the same height. Therefore, the edges of the opening side of the cross-sectional U-shape of the projection 61b form a single face. Furthermore, the pair of side walls 61c and 61d are provided so as to form parallel faces.

Figure 20:
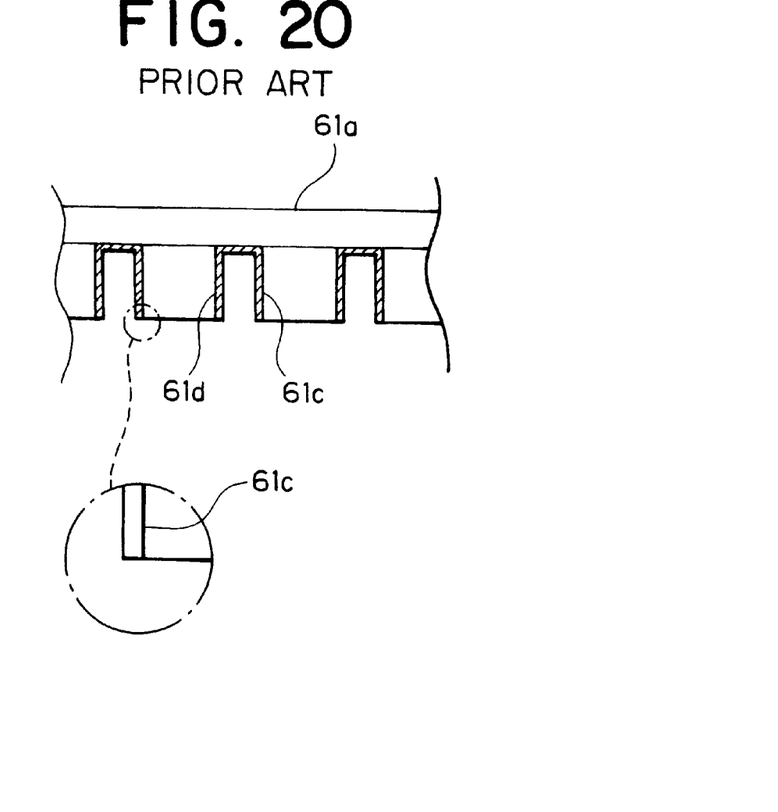
FIG. 20 is a cross-sectional view and a partially enlarged cross-sectional view taken along the line XX—XX of FIG. 16.

In addition, as shown clearly in FIG. 20, the tip edges of the side walls 61c and 61d of the projection 61b are molded to form a rectangle having right-angled corners.

In the insulated bobbin for stator of the above constitution, the first bobbin 61 and a second bobbin (not shown in the diagram) having the same shape as the first bobbin 61 are provided, and the first bobbin 61 and the second bobbin are arranged so as to clasp the projecting pole 1b of the stator iron core 1 from above and below with respect to the lamination direction. Thereafter, a generator coil is attached by winding. Then, the insulated bobbin provides electrical insulation between the stator iron core 1 and the generator coil 3.

In the insulated bobbin for stator of such a constitution, firstly, since the portion which the projecting pole 1b of the stator iron core 1 is inserted into, that is, the edges of the cross-sectionally U-shaped projection 61b, are the same height and in a single plane, when the stator iron core 1 is inserted into the insulated bobbin, positioning is awkward and insertion is difficult.

Furthermore, since the edges have not been chamfered, the corners of the edges strike the stator iron core 1, making it difficult to insert the stator iron core 1 into the insulated bobbin.

Figure 21:
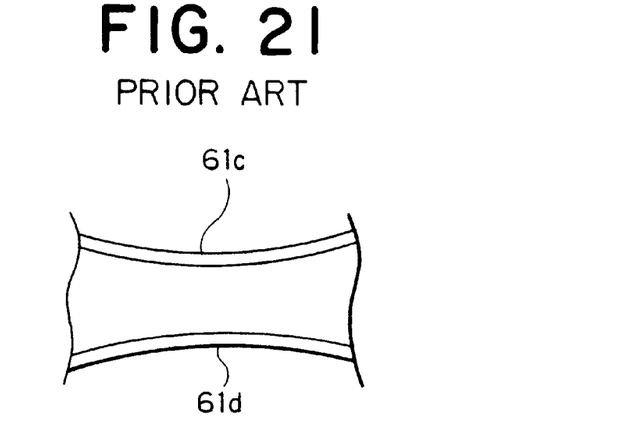
FIG. 21 is a diagram illustrating a state when an inner wall is bent to an arc.
Figure 22:
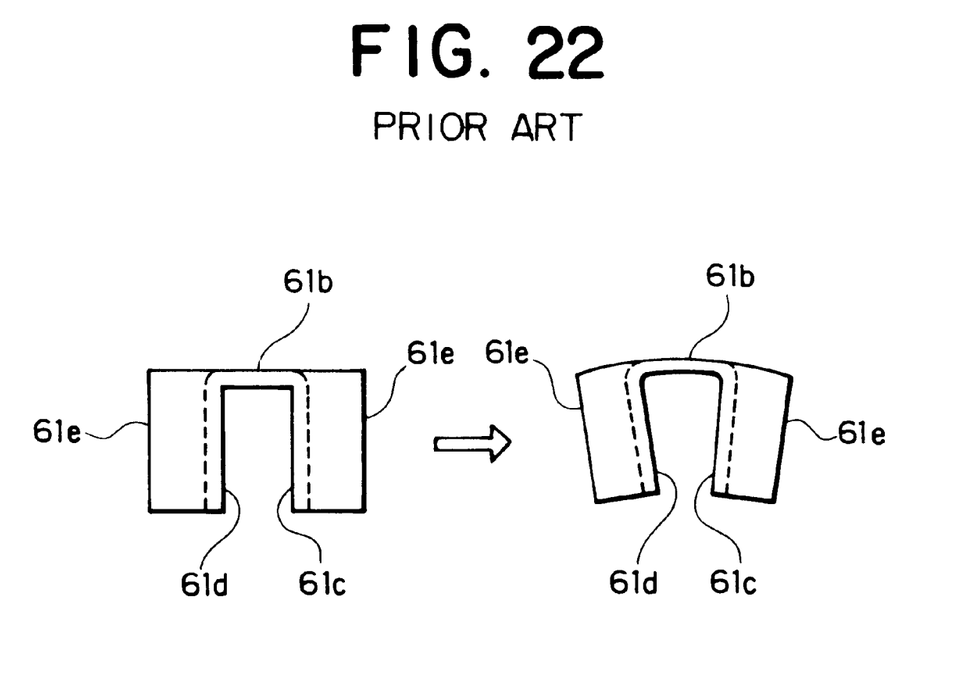
FIG. 22 is a diagram illustrating a state when an opening side of a projecting pole is modified by making it narrower.

Furthermore, as shown in FIG. 21, in the conventional insulated bobbin, heat shrinkage after molding causes the insides of the side walls 61c and 61d of the projection 61b to warp into an arc. Moreover, as shown in FIG. 22, in the conventional insulated bobbin, this deformation makes the opening side of the projection 61b narrow. As a result of such deformation, insertability of the stator iron core 1 is extremely poor.

On the other hand, when the thickness of the bobbin is increased in order to prevent deformation due to heat shrinkage after the insulated bobbin has been molded, there is less space for winding coil, consequently reducing output characteristics. In addition, when the thickness of the bobbin is increased, the coil has poor heat radiation, consequently raising the temperature of the generator coil 3.

Furthermore, when the gap between the stator iron core 1 and the bobbin is increased to enable the bobbin to fit around the stator iron core 1 even when the bobbin has suffered deformation due to heat shrinkage after molding, space for coil winding is reduced and output characteristics deteriorate. Furthermore, since the bobbin and the stator iron core 1 do not closely contact each other, when winding coil, there is a possibility that the bobbin may break due to tension of the conductive wire, or that the bobbin may move during winding and consequently disturb the winding of the wire.

In addition, in the conventional insulated bobbin for stator, after coil has been wound, the coil is secured by impregnation of varnish. However, since the open-end wire of the coil is not fixed before applying the varnish, the coil slackens during application of the varnish so that the coil is secured in a floating state, reducing vibration resistance of the coil.

Furthermore, an insulated bobbin for stator generally comprises resin mixed with glass fabric, and conventionally, high-tenacity nylon or the like is mainly used as the resin in order to prevent breakage. However, nylon has a disadvantage of poor insulation characteristics at high temperatures.

SUMMARY OF THE INVENTION

The present invention has been realized in order to solve the above problems and aims to provide an insulated bobbin for stator which has good insertability for the stator iron core and no reduction of winding space.

In order to achieve the above object, according to one aspect of the present invention, the insulated bobbin for stator of the present invention comprises: an insulated bobbin for stator, used in a stator of a multipolar magneto and provided between a stator iron core, comprising a substantially cylindrical iron core main body and a plurality of projecting poles which extend radially from the outer rim of the iron core main body, and generator coil wound around the projecting poles, for insulating the stator iron core and the generator coil, the insulated bobbin for stator comprising a first bobbin and a second bobbin, divided in a central axial direction of the stator iron core; the first bobbin and the second bobbin each comprising a bobbin inner rim wall, provided along an outer rim face of the iron core main body, and a plurality of projections projecting from the bobbin inner rim wall in the diameter direction, having an U-shaped cross-section with an opening facing the axis of division between the bobbins and provided so as to cover each of the projecting poles, the bobbin inner rim wall and the projections being molded into a single body; a pair of side walls of the projection having different heights in the central axial direction, whereby edges of the pair of side walls form a step.

According to another aspect of the present invention, the pair of side walls are bent in cross-section, so that the interval between them widens at the edges.

According to still another aspect of the present invention, a rim edge on the opening side of projections of the bobbin inner rim wall is sloping between adjacent projections.

According to a further aspect of the present invention, a tip and a root of the pair of side walls have different height along the central axial direction, so that the edges are sloping.

According to a still further aspect of the present invention, the first bobbin and the second bobbin are the same shapes.

According to another aspect of the present invention, chamfered faces are provided at corners of opposing sides of the edges of the pair of side walls.

According to still another aspect of the present invention, a flange is provided on the tip of the projecting pole, a pair of brims are provided on tips of the pair of side walls, the pair of brims spreading along the flange, and in addition, a join-reinforcing rib, for joining the pair of brims, is provided on a side opposite to the opening of the projection and substantially in the same plane as the brims.

According to a further aspect of the present invention, an outer rim reinforcing rib is provided to the outer rim of the pair of brims and the join-reinforcing rib, the outer rim reinforcing rib being provided substantially at a right angle to the brims and the join-reinforcing rib.

According to a still further aspect of the present invention, a predetermined interval is provided between the first bobbin and the second bobbin to prevent contact with portions other than a coil winding portion of the projecting pole.

According to another aspect of the present invention, a notch, for securing an open-end wire extending from the generator coil, is provided on a rim edge of a side which is opposite to the opening side of the projection on the bobbin inner rim wall.

According to still another aspect of the present invention, the first bobbin and the second bobbin are made from PET mixed with glass fabric or PPS mixed with glass fabric.

DESCRIPTION OF THE PREFERRED EMBODIMENTS

Embodiment 1

Figure 1:
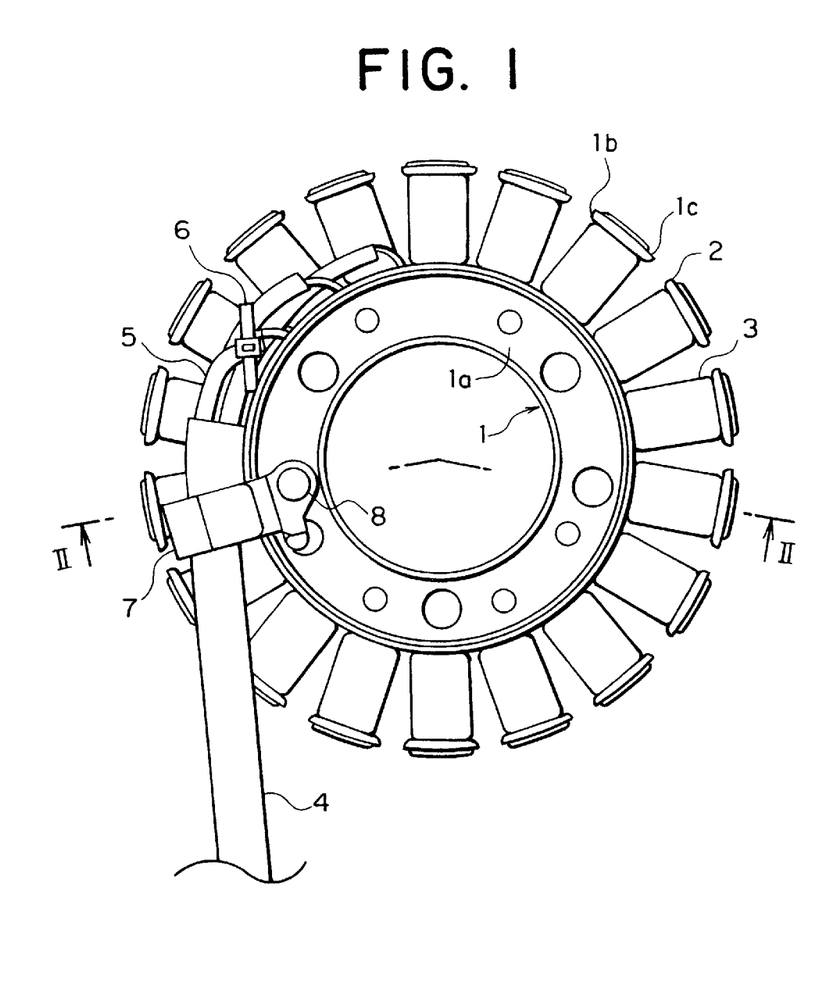
FIG. 1 is a front view of a stator of a multipolar magneto of the present invention.
Figure 2:
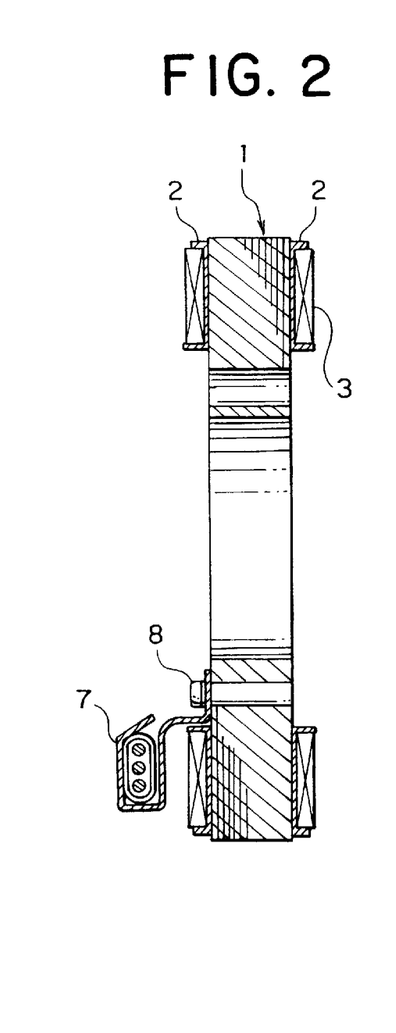
FIG. 2 is a cross-sectional view taken along the line II—II of FIG. 1.

FIG. 1 is a front view of a stator of a multipolar magneto of the present invention. FIG. 2 is a cross-sectional view taken along the line II—II of FIG. 1. In FIG. 1 and FIG. 2, eighteen projecting poles 1b extend radially around the outer rim of a stator iron core 1. In addition, a flange 1c is provided at the tip of each projecting pole 1b. An insulated bobbin for stator 2, comprising PET (polyethylene terephthalate), is provided to each of the projecting poles 1b.

Furthermore, a generator coil 3 is wound around each insulated bobbin for stator 2. After the generator coils 3 have been wrapped around the projecting poles 1b, they are fixed by impregnation in varnish. After the generator coils 3 have been fixed to the projecting poles 1b in this manner, a lead wire 4 is connected. The lead wire 4 is fixed by a lead clamp 7 and a screw for lead clamp 8. The connection between the generator coil 3 and the lead wire 4 is covered by a protective tube 5 and fixed to the generator coil 3 by a cable clamp 6.

Figure 3:
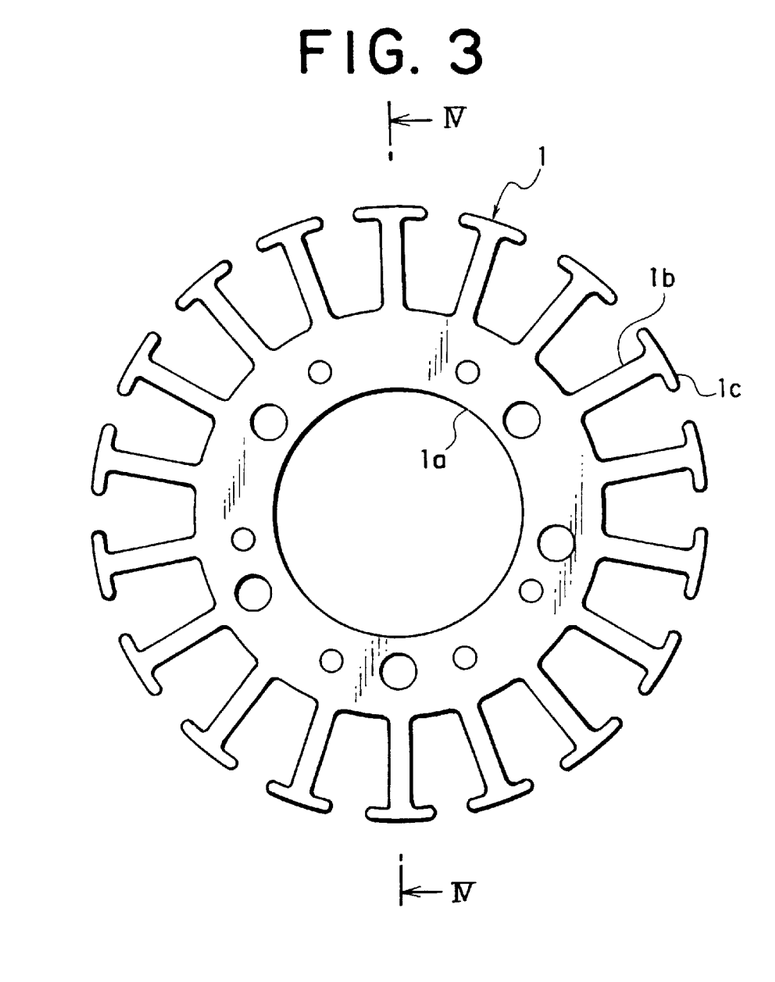
FIG. 3 is a front view of a stator iron core.
Figure 4:
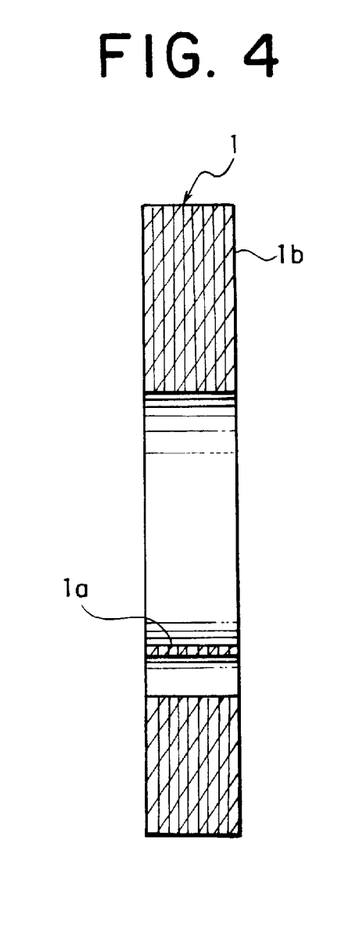
FIG. 4 is a cross-sectional view taken along the line IV—IV of FIG. 3.

FIG. 3 is a front view of a stator iron core. FIG. 4 is a cross-sectional view taken along the line IV—IV of FIG. 3. The stator iron core 1 is produced by lamination of multiple thin plates, and has a substantially cylindrical iron core main body 1*a* and multiple projecting poles 1*b* which run radially from the outer rim of the iron core main body 1*a*. Eighteen projecting poles 1*b* are provided at equal intervals to the outer rim of the iron core main body 1*a*.

Figure 5:
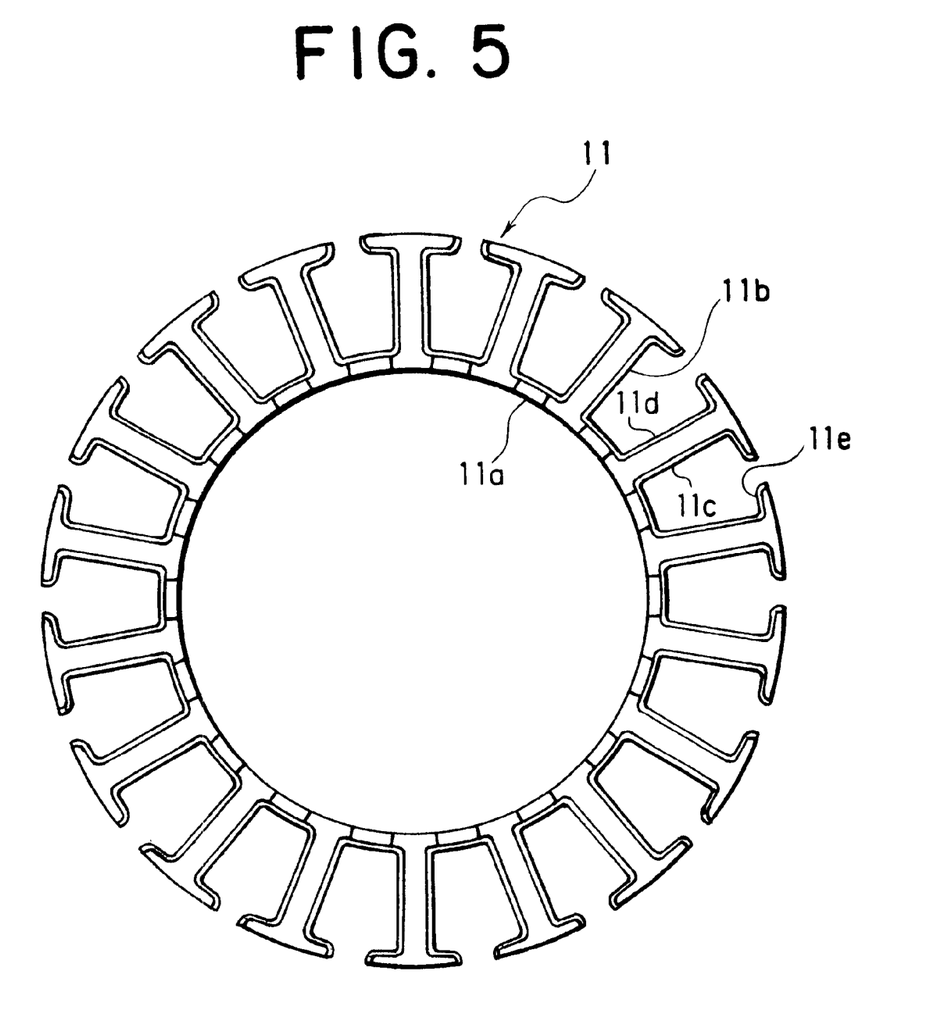
FIG. 5 is a front view of a first bobbin.
Figure 6:
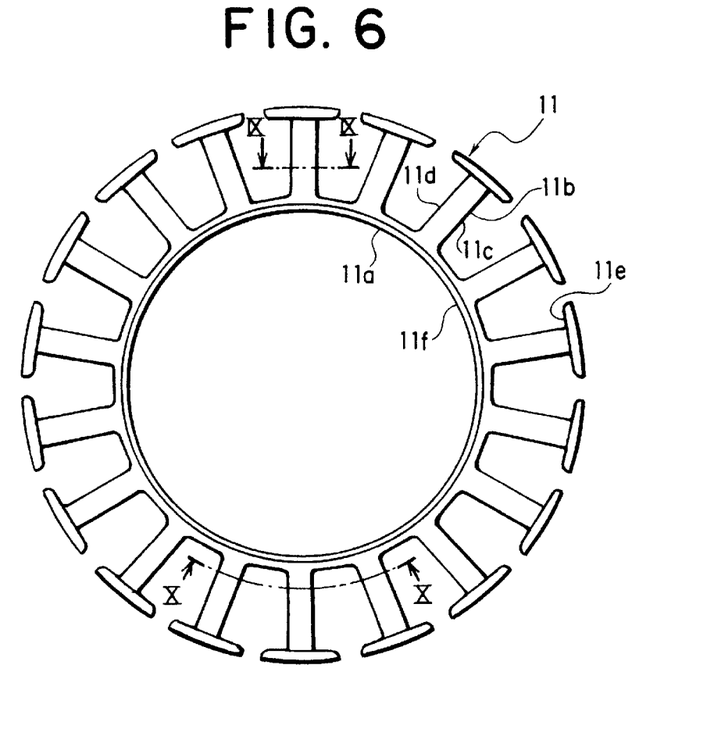
FIG. 6 is an under side view of the first bobbin.
Figure 7:
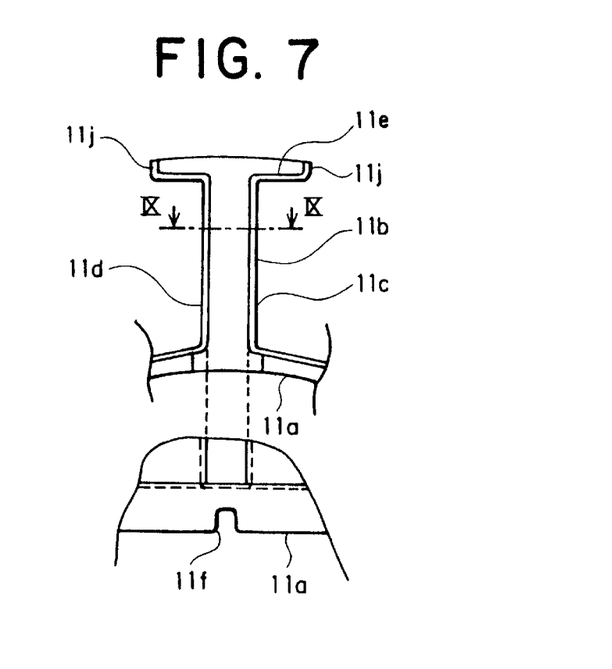
FIG. 7 is a front view of a part corresponding to one projecting pole and a view of the same part from the inside of the bobbin.
Figure 8:
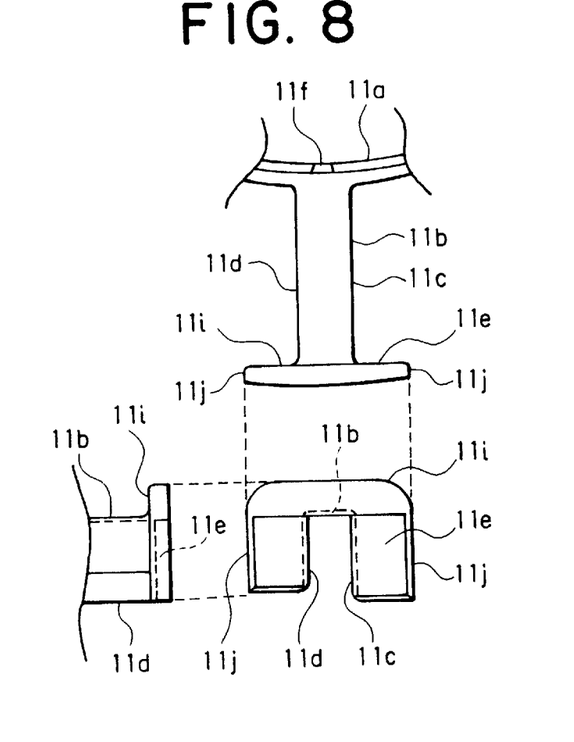
FIG. 8 is an under side view of a part corresponding to one projecting pole and a view of the same part from the outside of the bobbin.
Figure 9:
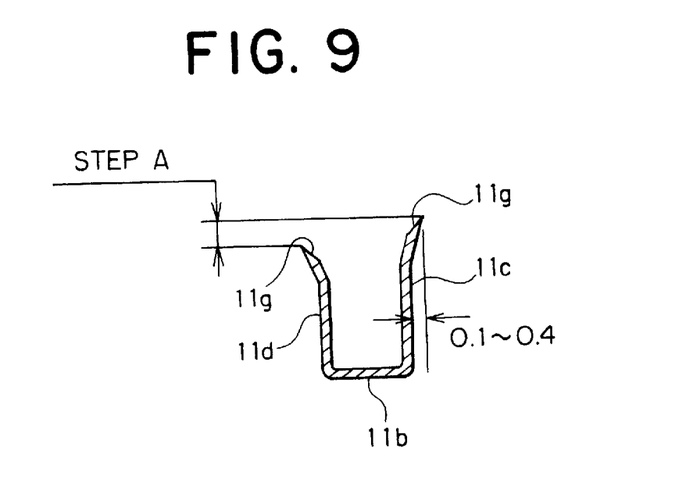
FIG. 9 is a cross-sectional view taken along the line IX—IX of FIG. 6 and FIG. 7.

Each insulated bobbin for stator 2 comprises a first bobbin and a second bobbin, divided in the direction of the center axis-of the stator iron core 1. In the present embodiment, the first and second bobbins are the same shape. FIG. 5 is a front view of a first bobbin. FIG. 6 is an under side view of the first bobbin. Furthermore, FIG. 7 is a front view of a part corresponding to one projecting pole and a view of the same part from the inside of the bobbin, and FIG. 8 is an under side view of a part corresponding to one projecting pole and a view of the same part from the outside of the bobbin. FIG. 9 is a cross-sectional view taken along the line IX—IX of FIG. 6 and FIG. 7. Furthermore, FIG. 10 is a cross-sectional view and a partially enlarged cross-sectional view taken along the line X—X of FIG. 6.

Firstly, in FIG. 5–FIG. 8, the first bobbin 11 has a substantially cylindrical bobbin inner rim wall 11*a* formed along the outer rim of the iron core main body 1*a* of the stator iron core 1. In addition, the first bobbin 11 has a projection 11*b*, which is U-shaped in cross-section and which projects radially in the diameter direction from the outer rim face of the bobbin inner rim wall 11*a*. These projections 11*b* are provided at equal intervals along the perimeter of the bobbin inner rim wall 11*a*, with the openings of the U-shaped cross-section facing one side of the central axial direction of the stator iron core 1. Each projection 11*b* has a pair of side walls 11*c* and 11*d* which run along both side faces of the projecting pole 1*b* of the stator iron core 1. A brim 11*e* is provided at the tip of the projection 11*b* and spreads along a flange 1*c* of the core 1.

Figure 10:
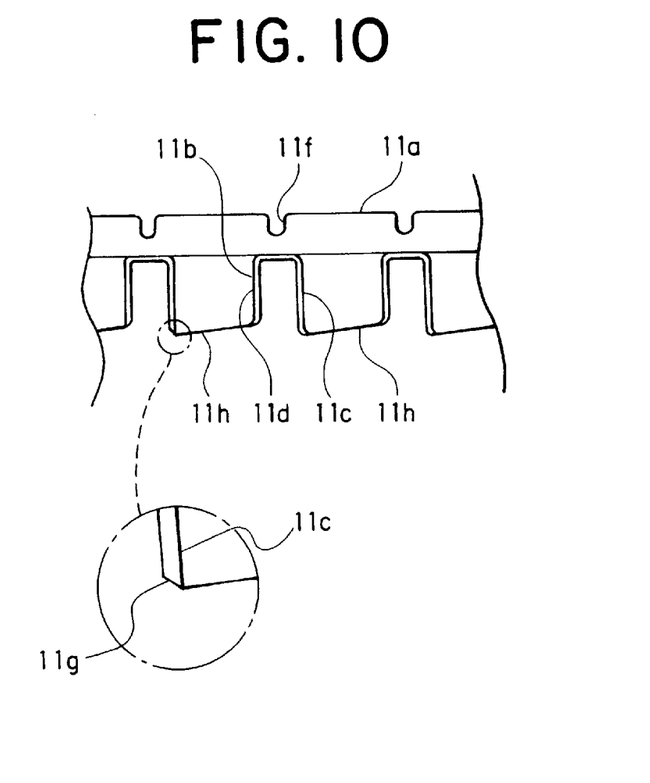
FIG. 10 is a cross-sectional view and a partially enlarged cross-sectional view taken along the line X—X of FIG. 6.

As shown clearly in FIG. 7 and FIG. 10, notches 11*f* are provided on the rim edge of the side which is opposite to the opening side of the projections 11*b* on the bobbin inner rim wall 11*a*, the notches 11*f* being provided in correspondence with the projections 11*b* and extending around the entire rim at equal intervals. These notches 11*f* fix the open-end wire running from the start point and end point of the winding of the generator coil 3.

Furthermore, as shown clearly in FIG. 9, the pair of side walls 11*c* and 11*d* of the projection 11*b* differ from the conventional case in having different heights. Then, the edges are arranged so as to create a step A. This is to facilitate insertion when the projecting poles 1*b* of the stator iron core 1 are inserted into the projections 11*b*, which are U-shaped in cross-section, as described later.

As shown clearly in the cross-sectional view of FIG. 9, the interval between the pair of side walls 11*c* and 11*d* increases at their edges on the opening side, this refraction creating a slight V-shape in cross-section. This V-shape refraction prevents the pair of side walls 11*c* and 11*d* from bending inwards to form an arc, as was described in the conventional technology of FIG. 21. As a consequence, the projecting poles 1*b* of the stator iron core 1 can easily be inserted into the projections 11*b*.

Furthermore, as shown clearly in FIG. 10, chamfered faces 11*g* are provided at the corners of the opposing upper edges of the side walls 11*c* and 11*d* of the projections 11*b*. This is to enable the projecting poles 1*b* of the stator iron core 1 to be more easily inserted into the cross-sectionally U-shaped projections 11*b*. Furthermore, as shown clearly in FIG. 10, since the pair of side walls 11*c* and 11*d* are of different heights, a slope 11*h* is formed on the edge of the bobbin inner rim wall 11*a* between adjacent projections 11*b*. These slopes 11*h* also enable the projecting poles 1*b* of the stator iron core 1 to be more easily inserted into the projections 11*b*.

Returning to FIG. 8, the pair of side walls 11*c* and 11*d* have a pair of brims 11*e* which spread along the flange 1*c* of the stator iron core 1, but in the present embodiment, a join-reinforcing rib 11*i* for joining the pair of brims 11*e* is further provided substantially in the same plane as the brims 11*e* on the side opposite to the opening of the projection 11*b*. This join-reinforcing rib 11*i* prevents deformation whereby the opening side of the projection 11*b* becomes narrow, described above in the conventional technology of FIG. 22, and improves insertability of the stator iron core 1.

In addition, as shown clearly in FIG. 8, an outer rim reinforcing rib 11*j* is provided to the outer rim of the pair of brims 11*e* and the join-reinforcing rib 11*i*. This outer rim reinforcing rib 11*j* prevents deformation in which the brims 11*e* and the join-reinforcing rib 11*i* become bent, and improves insertability of the stator iron core 1.

Further, the portion of the first bobbin 11 which contacts the projecting pole 1*b* of the stator iron core 1, that is, the portion other than the projection 11*b* which is U-shaped in cross-section, escapes in the upwards and downwards with respect to the central axial direction of the stator iron core 1, leaving a predetermined interval in between. This is to ensure that the projections 11*b* reliably adhere to the projecting poles 1*b*.

The total thickness of the first bobbin 11 is 0.4 mm, and partially 0.3 mm. The width of the projections 11*b*, which are U-shaped in cross-section, is the same as the width of the projecting poles 1*b*, but the length of the projections 11*b* is 0.1 mm shorter than the length of the projecting poles 1*b*.

Generally, resin mixed with glass fabric is used as material for the insulated bobbin for stator. Conventionally, in order to prevent breakage, high-tenacity nylon or the like has mainly been used as this resin. However, as mentioned above, nylon has the disadvantage of poor insulation characteristics at high temperature. In the present embodiment, PET (polyethylene terephthalate) is used. Conventionally, PET has not been used because it has low tenacity, but since bobbin thickness in the present embodiment is 0.4 mm, which is considerably thinner than the conventional bobbin, the resultant film effect generates tenacity and makes breakage unlikely. Consequently, since PET has good insulation characteristics even at high temperature, product reliability and durability are improved.

In an insulated bobbin for stator of such a constitution, the first bobbin 11 and a second bobbin (not shown in the diagram), which is the same shape as the first bobbin 11, clasp the projecting poles 1*b* of the stator iron core 1 from above and below with respect to the lamination direction. Thus, electrical insulation is provided between the stator iron core 1 and the generator coil 3. Now, the high side walls 11*c* of the projections 11*b* oppose the low side walls 11*d*, and the edges of both interlock with a predetermined uniform micro-interval therebetween. Furthermore, since the slopes 11*h* are in opposite directions, the gap does not greatly increase. The size of the refraction of the side walls 11*c* and 11*d* is set to roughly 0.1 mm–0.4 mm, so as not to reduce coil winding space.

Figure 11:
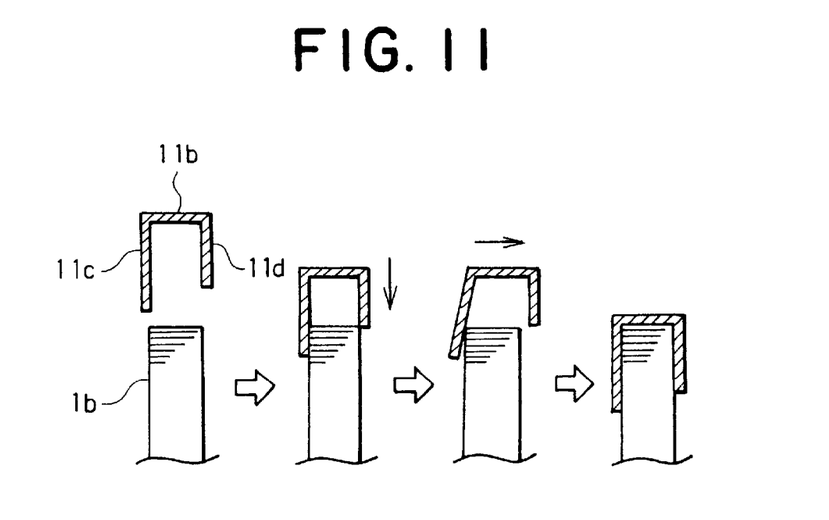
FIG. 11 is a diagram illustrating insertion of a stator iron core into an insulated bobbin for stator.

As shown in FIG. 11, in an insulated bobbin for stator of the constitution described above, the projecting pole 1*b* of the stator iron core 1 is positioned by pushing against the edge of the high side wall 11c, and from this state, when the bobbin is slightly rotated in a predetermined direction around the center axis of the stator iron core 1, the opening of the projection 11b widens. Since the projecting pole 1b is inserted into the projection 11b in this state, insertion is extremely smooth. Consequently, insertion can be accomplished extremely easily in a short time, lowering costs.

In the present embodiment, the pair of side walls 11c and 11d of the projection 11b are refracted in cross-section, but alternatively, this refraction may be a bend. That is, the shape should be one which will prevent deformation in which the pair of side walls 11c and 11d bend inwardly to an arc, and therefore flection such as refraction or bending is acceptable. A refracted shape is more convenient for, for instance, manufacture using metal or the like, and has excellent strength, while achieving the same effect of preventing deformation caused by shrinkage after injection molding.

Furthermore, in the present embodiment, the pair of side walls 11c and 11d of the projection 11b are of different height, whereby their edges create a step A. In addition, a slope 11h is provided to the edge of the bobbin inner rim wall 11a between adjacent projections 11b. Moreover, the height along the central axial direction of the tips of the side walls 11c and 11d may be different from the height of the base portions, so that the edges of the side walls 11c and 11d are sloping. That is, the side walls 11c and 11d can be set so that they slope, becoming higher or lower as they approach their tips. Such a shape further improves the insertability of the stator iron core 1. However, when there is a slope whereby the edges rise or fall as they approach the tip, the first bobbin and the second bobbin cannot be the same shape. Since this portion must be canceled by giving the bobbins opposite shapes, there is a disadvantage that costs of manufacture in metal are increased.

The insulated bobbin for stator of the present embodiment comprises PET, but the same effects can be achieved using PPS (polyphenylenesulfide).

According to one aspect of the present invention, the insulated bobbin for stator of the present invention comprises an insulated bobbin for stator, used in a stator of a multipolar magneto and provided between a stator iron core, comprising a substantially cylindrical iron core main body and a plurality of projecting poles which extend radially from the outer rim of the iron core main body, and generator coil wound around the projecting poles, for insulating the stator iron core and the generator coil, the insulated bobbin for stator comprising a first bobbin and a second bobbin, divided in a central axial direction of the stator iron core; the first bobbin and the second bobbin each comprising a bobbin inner rim wall, provided along an outer rim face of the iron core main body, and a plurality of projections projecting from the bobbin inner rim wall in the diameter direction, having an U-shaped cross-section with an opening facing the axis of division between the bobbins and provided so as to cover each of the projecting poles, the bobbin inner rim wall and the projections being molded into a single body; a pair of side walls of the projection having different heights in the central axial direction, whereby edges of the pair of side walls form a step. Consequently, the stator iron core can easily be inserted into the insulated bobbin for stator, insertion can be performed simply and in short time, and costs can be lowered. Moreover, there is no reduction of coil winding space.

According to another aspect of the present invention, the pair of side walls are bent in cross-section, so that the interval between them widens at the edges. Consequently, the stator iron core can be inserted more easily.

According to still another aspect of the present invention, a rim edge on the opening side of projections of the bobbin inner rim wall is sloping between adjacent projections. Consequently, the stator iron core can be inserted more easily.

According to a further aspect of the present invention, a tip and a root of the pair of side walls have different height along the central axial direction, so that the edges are sloping. Consequently, the stator iron core can be inserted more easily.

According to a still further aspect of the present invention, the first bobbin and the second bobbin are the same shape. Consequently, costs can be considerably lowered by using only one type of metal or the like.

According to another aspect of the present invention, chamfered faces are provided at corners of opposing sides of the edges of the pair of side walls. Consequently, the stator iron core can be inserted still more easily into the insulated bobbin for stator.

According to still another aspect of the present invention, a flange is provided on the tip of the projecting pole, a pair of brims are provided on tips of the pair of side walls, the pair of brims spreading along the flange, and in addition, a join-reinforcing rib, for joining the pair of brims, is provided on a side opposite to the opening of the projection and substantially in the same plane as the brims. Consequently, deformation, whereby shrinkage occurs after injection molding, can be prevented and the stator iron core can be inserted still more easily into the insulated bobbin for stator.

According to a further aspect of the present invention, an outer rim reinforcing rib is provided to the outer rim of the pair of brims and the join-reinforcing rib, the outer rim reinforcing rib being provided substantially at a right angle to the brims and the join-reinforcing rib. Consequently, deformation, whereby shrinkage occurs after injection molding, can be prevented and the stator iron core can be inserted still more easily into the insulated bobbin for stator.

According to a still further aspect of the present invention, a predetermined interval is provided between the first bobbin and the second bobbin to prevent contact with portions other than a coil winding portion of the projecting pole. Consequently, the projection reliably adheres to the projecting pole.

According to another aspect of the present invention, a notch, for securing an open-end wire extending from the generator coil, is provided on a rim edge of a side which is opposite to the opening side of the projection on the bobbin inner rim wall. Consequently, the coil does not slacken during application of varnish, improving reliability.

According to still another aspect of the present invention, the first bobbin and the second bobbin are made from PET mixed with glass fabric or PPS mixed with glass fabric. Consequently, insulation characteristics are improved even at high temperature, thereby improving product reliability and durability.

What is claimed is:

1. An insulated bobbin for stator, used in a stator of a multipolar magneto and provided between a stator iron core, comprising a substantially cylindrical iron core main body and a plurality of projecting poles which extend radially from the outer rim of said iron core main body, and generator coil wound around said projecting poles, for insulating said stator iron core and said generator coil, said insulated bobbin for stator comprising:

a first bobbin and a second bobbin, divided in a central axial direction of said stator iron core;

said first bobbin and said second bobbin each comprising a bobbin inner rim wall, provided along an outer rim face of said iron core main body, and a plurality of projections projecting from said bobbin inner rim wall in the diameter direction, having an U-shaped cross-section with an opening facing the axis of division between said bobbins and provided so as to cover each of said projecting poles, said bobbin inner rim wall and said projections being molded into a single body;

a pair of side walls of said projection having different heights in said central axial direction, whereby edges of said pair of side walls form a step.

2. The insulated bobbin for stator according to claim 1, wherein said pair of side walls are bent in cross-section, so that the interval between them widens at said edges.

3. The insulated bobbin for stator according to claim 1, wherein a rim edge on an opening side of projections of said bobbin inner rim wall is sloping between adjacent projections.

4. The insulated bobbin for stator according to claim 1, wherein a tip and a root of said pair of side walls have different height along said central axial direction, so that said edges are sloping.

5. The insulated bobbin for stator according to claim 1, wherein said first bobbin and said second bobbin are the same shape.

6. The insulated bobbin for stator according to claim 1, wherein chamfered faces are provided at corners of opposing sides of said edges of said pair of side walls.

7. The insulated bobbin for stator according to claim 1, wherein a flange is provided on a tip of said projecting pole, a pair of brims are provided on tips of said pair of side walls, said pair of brims spreading along said flange, and in addition, a join-reinforcing rib, for joining said pair of brims, is provided on a side opposite to said opening of said projection and substantially in the same plane as said brims.

8. The insulated bobbin for stator according to claim 1, wherein an outer rim reinforcing rib is provided to the outer rim of said pair of brims and said join-reinforcing rib, said outer rim reinforcing rib being provided substantially at a right angle to said brims and said join-reinforcing rib.

9. The insulated bobbin for stator according to claim 1, wherein a predetermined interval is provided between said first bobbin and said second bobbin to prevent contact with portions other than a coil winding portion of said projecting pole.

10. The insulated bobbin for stator according to claim 1, wherein a notch, for securing an open-end wire extending from said generator coil, is provided on a rim edge of a side which is opposite to the opening side of the projection on said bobbin inner rim wall.

11. The insulated bobbin for stator according to claim 1, wherein said first bobbin and said second bobbin are made from PET mixed with glass fabric or PPS mixed with glass fabric.

* * * * *